Dec. 8, 1964 K. J. DUDDLESTON 3,160,436
TARPAULIN SUPERSTRUCTURE FOR TRAILERS
Filed July 6, 1962 6 Sheets-Sheet 1
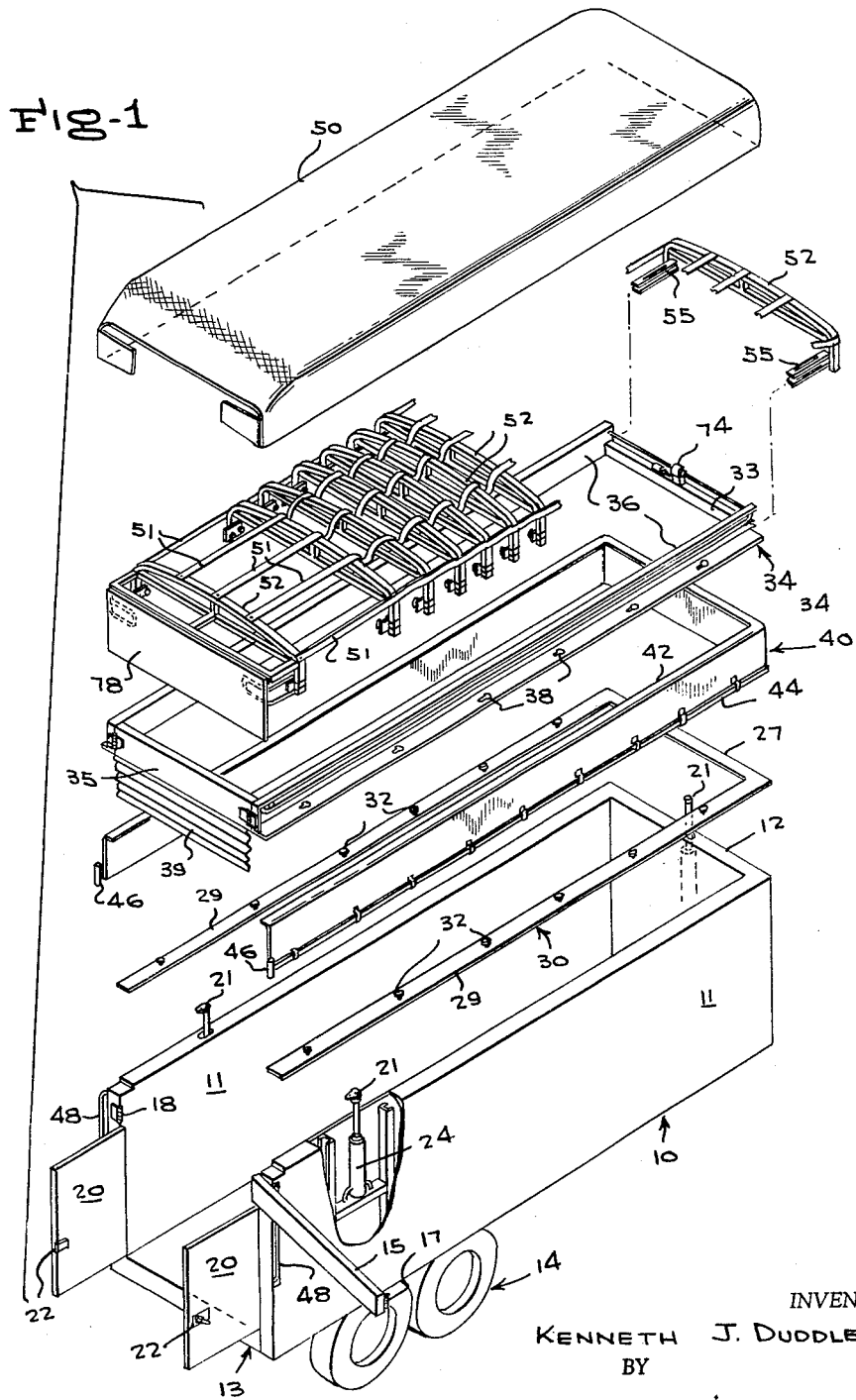
INVENTOR.
KENNETH J. DUDDLESTON
BY
McMorrow, Berman & Davidson
ATTORNEYS

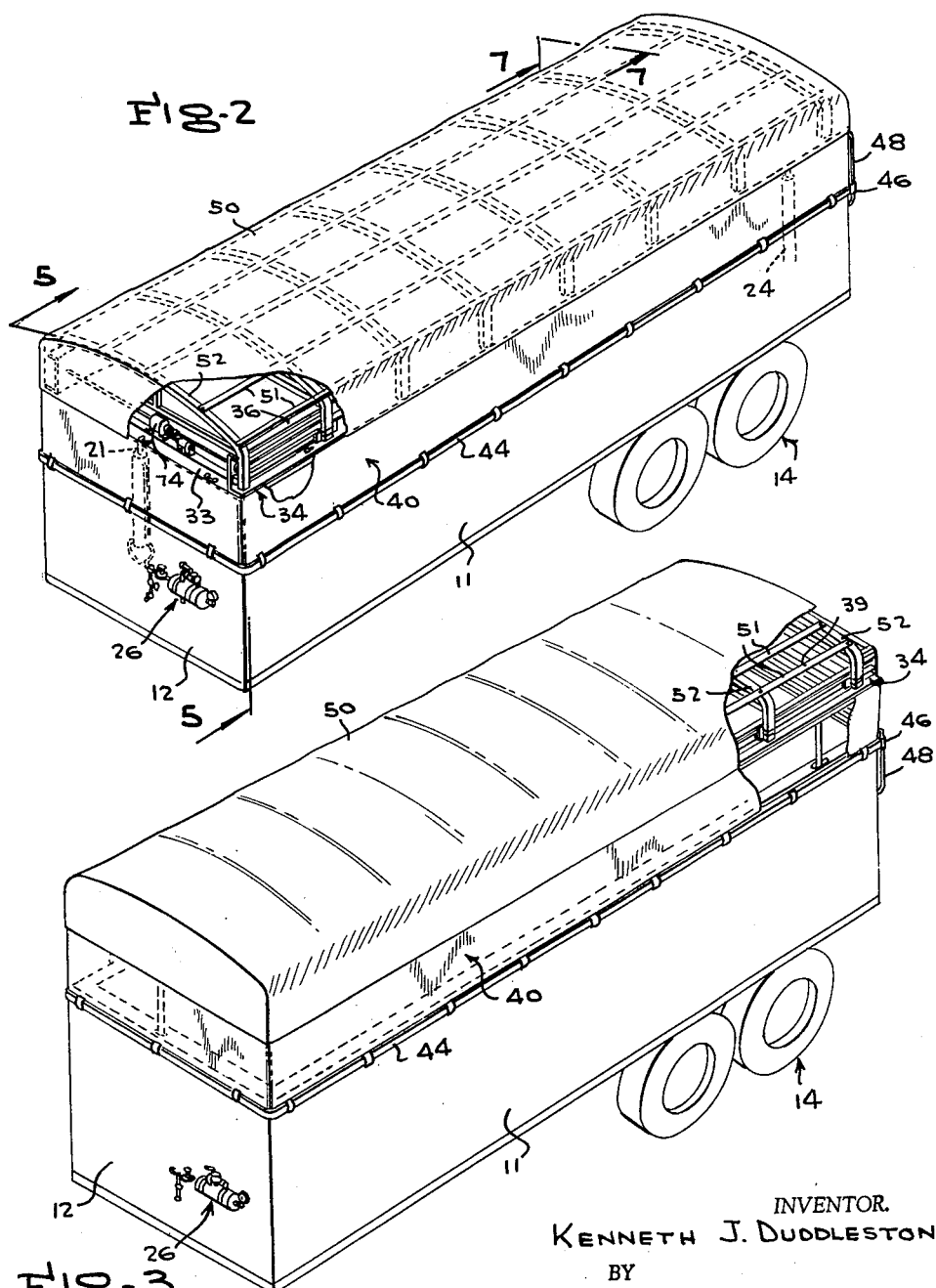

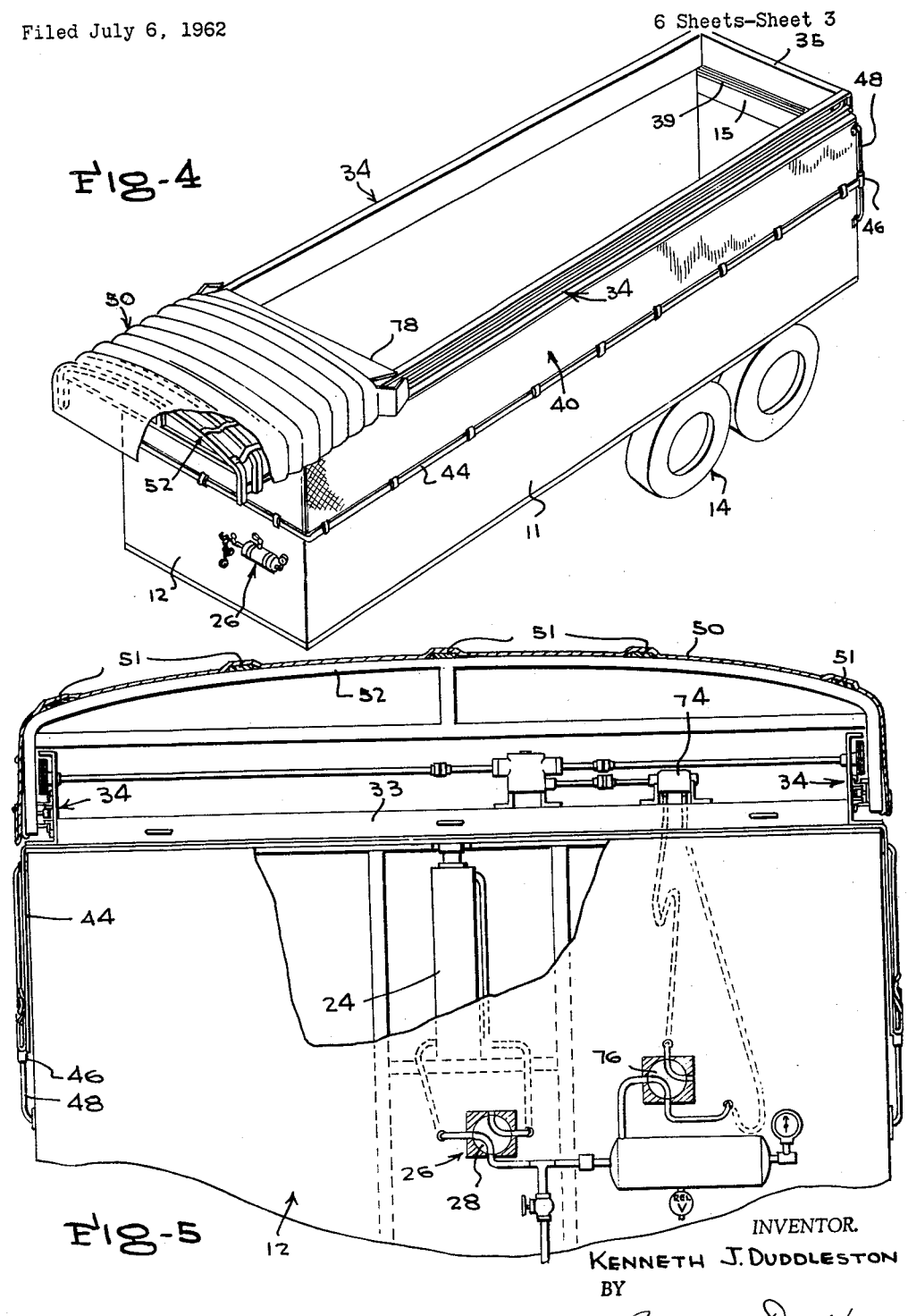

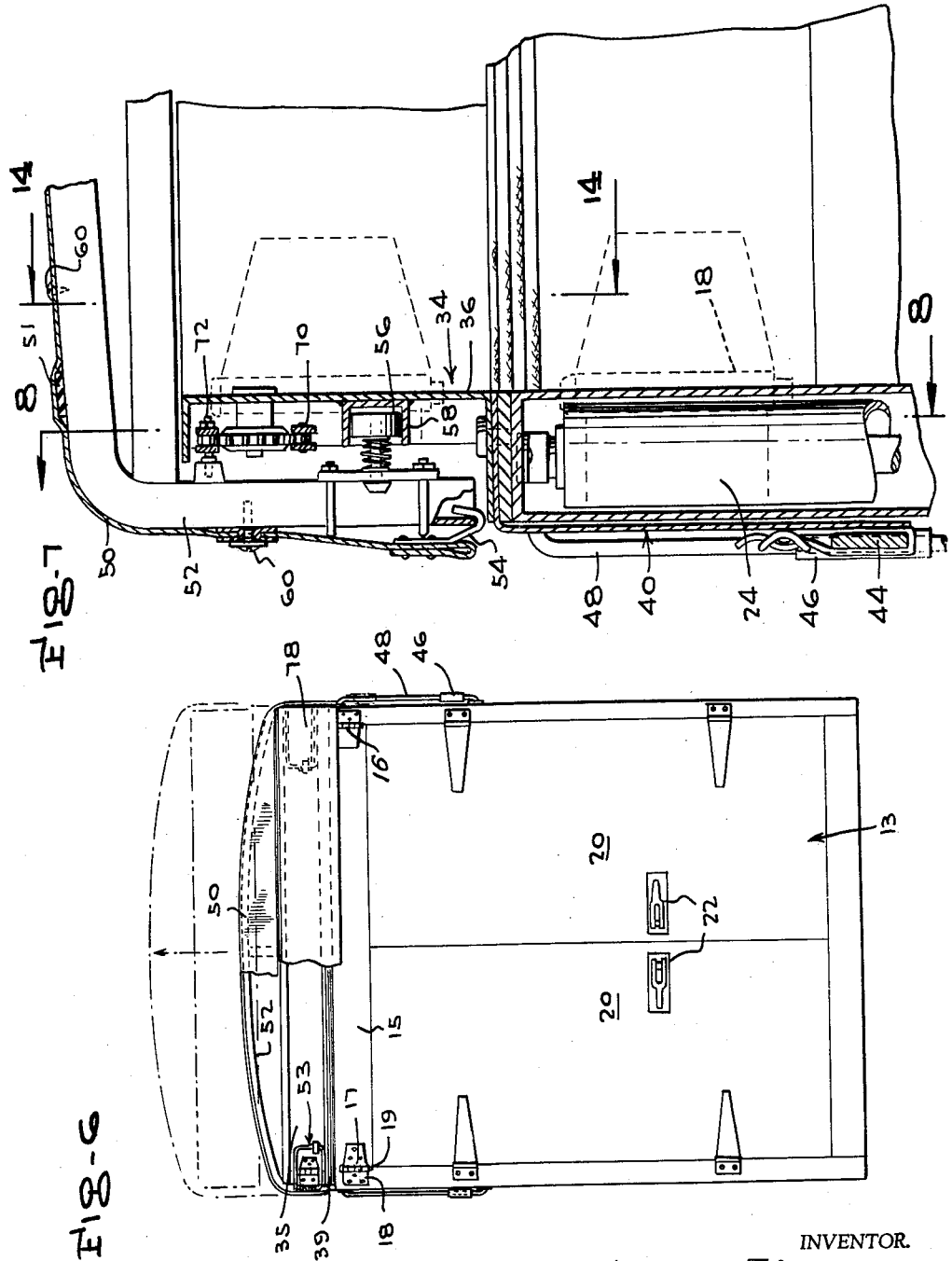

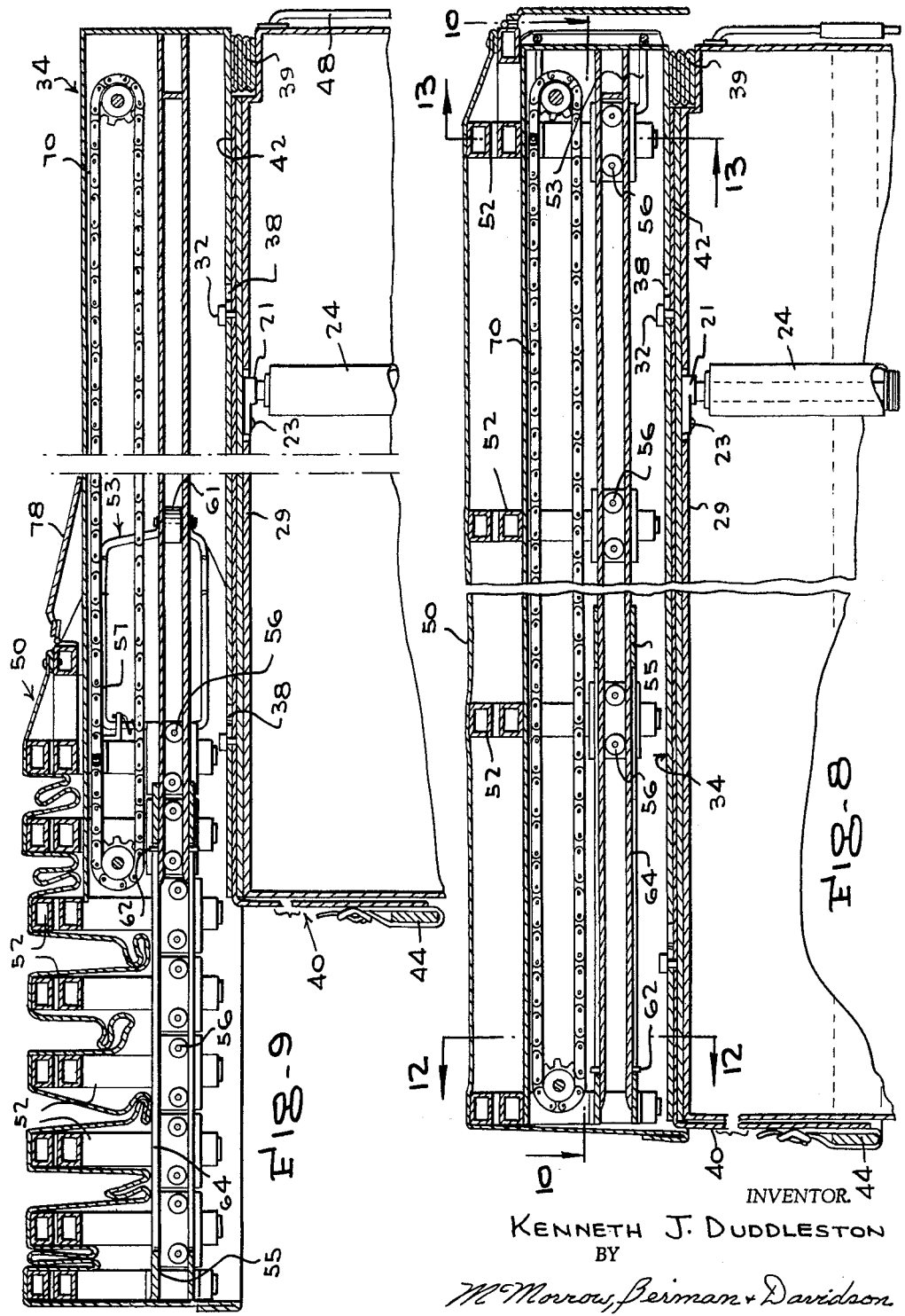

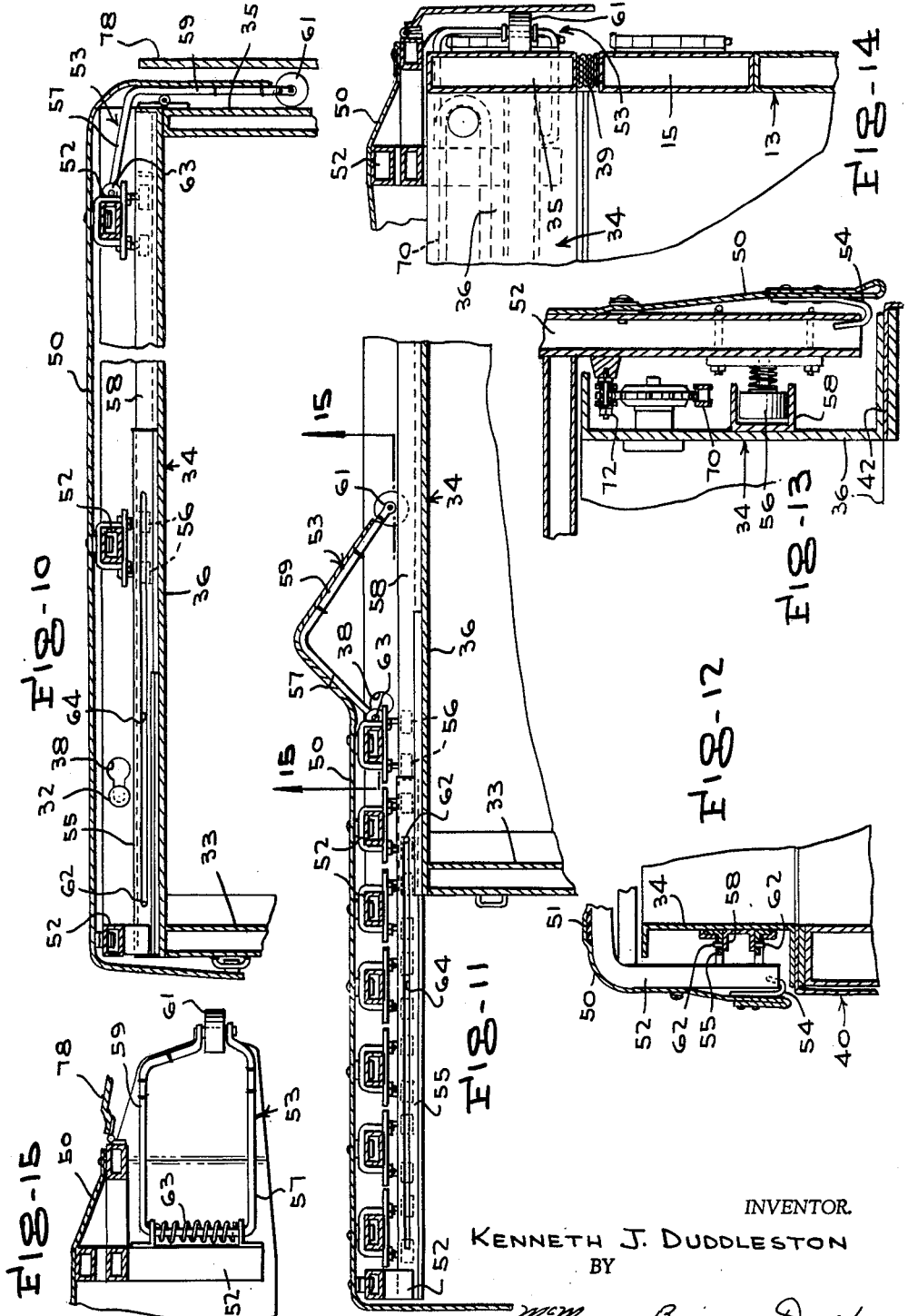

United States Patent Office 3,160,436
Patented Dec. 8, 1964

3,160,436
TARPAULIN SUPERSTRUCTURE FOR TRAILERS
Kenneth J. Duddleston, 3010 S. Quinn St., Chicago, Ill.
Filed July 6, 1962, Ser. No. 208,024
2 Claims. (Cl. 296—105)

This invention relates to a superstructure for trailers.

An object of the present invention is to provide a superstructure of the tarpaulin type which lends itself for ready erection over and support upon a trailer.

Another object of the present invention is to provide a tarpaulin superstructure which when erected and supported upon a trailer may be employed so that the cover extends over and encloses the top of the trailer, or over and be elevated above the top of the trailer, or in a position exposing the top of the trailer.

A further object of the present invention is to provide a tarpaulin superstructure which is simple in construction, highly efficient in action, and commercially feasible.

Other objects and advantages of the present invention will become apparent from the following description taken in conjunction with the accompanying drawings, in which:

FIGURE 1 is an exploded view of the tarpaulin superstructure of the present invention disposed over a trailer.

FIGURE 2 is a perspective view illustrating the tarpaulin superstructure of FIGURE 1 erected and supported upon the trailer with the cover in closed position.

FIGURE 3 is a perspective view of the assembly of FIGURE 2 but showing the cover raised above and overlying the trailer.

FIGURE 4 is a perspective view illustrating the assembly of FIGURE 2 but showing the cover in retracted position, and the retracted cover extended partially beyond the front end wall of the trailer.

FIGURE 5 is an enlarged fragmentary view, partly in section and broken away, taken along the line 5—5 adjacent the front end of the assembly of FIGURE 2.

FIGURE 6 is an enlarged rear end view of the assembly of FIGURE 2 with the dotted line showing indicating the cover in the elevated position above the top of the trailer, and the full line showing indicating the cover in closed position.

FIGURE 7 is an enlarged fragmentary sectional view taken on the line 7—7 of FIGURE 2.

FIGURE 8 is a sectional view taken on the line 8—8 of FIGURE 7.

FIGURE 9 is a sectional view of the assembly of FIGURE 8 but showing the cover projected beyond the front wall of the trailer.

FIGURE 10 is a sectional view taken on the line 10—10 of FIGURE 8.

FIGURE 11 is a sectional view of the assembly of FIGURE 10, but showing the cover extended beyond the front wall of the trailer.

FIGURE 12 is a fragmentary sectional view taken on the line 12—12 of FIGURE 8.

FIGURE 13 is a fragmentary sectional view taken on the line 13—13 of FIGURE 8.

FIGURE 14 is a fragmentary sectional view taken on the line 14—14 of FIGURE 7; and FIGURE 15 is a fragmentary sectional view taken on the line 15—15 of FIGURE 11.

Referring to the drawings, the numeral 10, FIGURES 1 to 4, designates a trailer having spaced side walls 11, a front end wall 12, and a rear end wall 13, the trailer at its rear end portion being supported upon spaced pairs of wheels 14 arranged in tandem relation. As shown in FIGURES 1 and 6, the rear end wall 13 comprises a header bar 15 which has one end hingedly connected, as at 16, to the upper rear end portion of one of the side walls 11, and has the other end provided with a hinge element 17 which is releasably securable to a cooperating hinge element 18 provided on the upper rear end portion of the other of the side walls 11 by means of a hinge pin 19, FIGURE 6. Also comprising a part of the rear end wall 13 are a pair of openable and closable doors 20, the doors 20 being shown in closed position in FIGURE 6, and beign shown in open position in FIGURE 1. The doors 20 are releasably locked in closed position by cooperating latch elements 22.

A plurality of elevating and lowering means are disposed in spaced relation about and are supported upon the walls of the trailer 10. As shown in FIGURE 1, there is an elevating and lowering means 24 supported upon each of the side walls 11 of the trailer 10, and upon the front end wall 12 of the trailer. Each of said means embodies a hydraulic cylinder assembly with a reciprocating piston working therein. The hydraulic cylinder assembly with the projecting portion 21, FIGURE 1, is shown only on one of the side walls 11 of the trailer 10, and only the projecting end portion of the piston of the hydraulic cylinder assembly on the other of the side walls 11, and on the front end wall 12, are shown in the aforesaid figure. On the front end wall 12 of the trailer 10, FIGURES 2 and 5, is shown the actuating means generally indicated by the numeral 26, and which is operatively connected to the plurality of elevating and lowering means or hydraulic cylinder assembly 24 for simultaneously effecting the elevating and lowering movements of the aforesaid means or assembly. With the valve 28 of the actuating means 26 shown in the position illustrated in FIGURE 5 the elevating the lowering means are about to begin the elevating movements. Reversal of the valve 28, enables the elevating and lowering means to begin the lowering movements. Since these hydraulic assemblies and the actuating means therefor are conventional, a more detailed explanation of the structure and operation appears unnecessary.

A mounting member 30 is provided which is conformably shaped to fit upon the walls of the trailer 10. The mounting member has, FIGURE 1, spaced side pieces 29, and a front end piece 27. This member is superimposed upon the trailer 10 so that the side pieces 29 overlie and extend along the side walls 11 of the trailer 10 with the front end piece 27 overlying and extending along the front end wall 12 of the trailer 10, the side pieces 29 and front end piece 27 being connected to the projecting piston ends 21 of the adjacent elevating and lowering means 24 for movement with the latter means. The front end piece 27 is attached to the projecting piston end 21 of the adjacent elevating and lower means 24 by welding. The side end pieces 29 of the mounting member 30 are pivotally attached, as by rivets 23, to the shoes provided on the projecting piston ends 21 of the adjacent elevating and lowering means 24. Extending along and rising from each of the side pieces 29 of the mounting member 30, FIGURE 1, are securing headed pins 32, the purpose of which will become subsequently apparent.

Superimposed upon the mounting member 30 is a frame 34. The frame 34 comprises spaced side elements 36, a front end element 33, and a rear end element 35. The frame 34 is disposed upon the mounting member 30 so that the side elements 36 and front element 33 overlie and engage the side pieces 29 and front end piece 27 of the mounting member 30 with the headed pins 32 of the side pieces 29 embracingly engaged by the narrow end portions of the complemental bayonet slots 38 provided on the frame side elements 36, thereby fixedly attaching the frame 34 to the mounting member 30. A foldable curtain 39 depends from the rear end element 35 of the frame 34 which is wedged between the latter element 35 and the trailer rear end header bar 15.

A skirt 40 is dependingly supported from the mounting member 30 and frame 34 and extends about the exterior of the trailer 10. Specifically, the skirt 40 is shaped so as to have an inturned border 42 about its upper end and to extend along the trailer side walls 11 and trailer front end wall 12. The lower end portion of the skirt 40 is provided with a weight 44 extending therealong. The skirt 40 is disposed so that the border 42 is between and extends along the side pieces 29 and front piece 27 of the mounting member 30 and the side elements 36 and front end element 33 of the frame 34 with the skirt depending about the exterior of the trailer side walls 11 and trailer front end wall 12, and being maintained in a taut condition by means of the weight 44. The free ends of the skirt 40 are secured to the trailer side walls 11 by means of sleeves 46 on the skirt 40 which engage brackets 48 provided on the trailer side walls 11.

A retractable and extensible cover 50 extends over the frame 34, and means is on the frame 34 which is operatively connected to the cover for moving the cover between an extended position completely overlying the frame 34 and a retracted position adjacent to and partially overhanging the front end wall 12 of the trailer and exposing the top of the trailer. Said means comprises a plurality of transversely-disposed arched bows 52 positioned beneath and attached to the cover 50, and arranged so as to extend longitudinally along and overlie the frame 34 and connected to the frame 34 for rolling movement between positions spaced from each other when the cover 50 is in the extended position and overlying the frame to positions in side-by-side relation with respect to each other when the cover is in the retracted position. The cover 50 is attached to the respective bows 52 by means of spaced opposed pairs of hooks 54 provided on the inner face of the cover inwardly of and adjacent its side edges which releasably engage the lower edge portions of the bows 52, and screws 60, FIGURE 7, carried by the cover and engaging the bows 52. The respective bows 52 are conected for the aforesaid rolling movement by means of opposed rollers 56 on the lower ends of each bow, the rollers 56 rollably engaging trackways 58 carried by and extending along the side elements 36 of the frame 34.

Extending longitudinally from the bow 52 nearest the rear end wall 13 of the trailer 10 to the bow 52 nearest the front end wall 12 of the trailer and secured to the bows 52 are a plurality of straps 51, the strap adjacent each of the side walls 11 of the trailer being fabricated of elastic material such as rubber, and the straps between the elastic straps being fabricated of flexible material such as cloth or canvas.

By reference to FIGURE 1, it will be seen that the bows 52 nearest the front end element 33 of the frame 34 is provided with a pair of track extensions 55 which nest within the tracks 58 when the bows 52 are in the position overlying the frame 34 with the cover 50 in the extended position, and which are projected beyond the trailer front end wall 12 when the bows 52 are in the side-by-side relation with respect to each other with the cover 50 in the retracted position, the track extensions 55 being connecting to the tracks 58 for movement between the nested and projected positions by means of upstanding pins 62 on the tracks 58 adjacent the ends contiguous to the trailer front end wall 12 extending slidably through elongated slots 64 provided or formed in the track extensions 55, as shown in FIGURE 9.

As shown in FIGURES 1, 11 and 15, the bow 52 nearest the rear end wall 13 of the trailer 10 is provided adjacent each of its lower ends with an anchor member 53. The anchor member 53 is of right-angled configuration and has the free end of its short leg 57 spring biasedly connected as at 63 to the adjacent lower end portion of the bow 52 nearest the rear end wall 13 of the trailer 10 and has the free end of its long leg 59 provided with a roller 61 which rides along and engages the adjacent side element 36 of the frame 34 when the bows 52 are in the position of being spaced from each other and which rides along and engages the rear end element 35 of the frame when the bows 52 have been moved to their extended position or the position of FIGURE 2.

An endless drive means which is movable in opposite directions is carried by the frame 34, such means being an endless drive chain 70 which is carried by each of the side elements 36 of the frame 34 and is cooperatively disposed with respect to the bows 52. The drive chains 70 are each operatively connected to the bow 52 nearest the trailer rear end wall 13 for movement therewith by means of a pin 72 carried by the chain 70 and secured to the said bow, as clearly shown in FIGURE 13. The chains 70 are simultaneously driven in the desired direction by means of a reversible air motor 74 carried by the front end element 33 of the frame 34, the air motor being driven in either of the directions to cause the cover to move from its extended position or to its retracted position depending upon the position of the reversible valve 76 of the hydraulic system to which the air motor is connected, and which system is carried by the trailer front end wall 12.

It is to be noted that the bow 52 nearest the rear end element 35 of the frame 34 carries a swingable gate 78 which extends over and conceals the header bar 15, the folded curtain 39, and the rear end element 35 of the frame 34, when the cover 50 is in the extended position, and which gate 78 is swung wholly out of its position of concealment when the cover is in its retracted position and partially overhanging the trailer front end wall 12 of the trailer 10.

In operation, with the cover 50 in the extended position and closing the top of the trailer 10, the position illustrated in FIGURE 2, the cover 50 may be elevated bodily to a position above and spaced above the top of the trailer 10, the position illustrated in FIGURE 3, by causing the actuation of the hydraulic cylinder assembly 24 so as to effect this raising movement. When it is desired to restore the cover assembly to the closing position of FIGURE 2, the valve 28 is shifted to the proper position to cause the lowering movement of the hydraulic cylinder assembly 24. Should it be desired to shift the cover from the extended position closing the top of the trailer 10 to the retracted position partially overhanging the front end wall 12 of the trailer 10 and exposing the top of the trailer 10, the position illustrated in FIGURE 4, the valve 76 is shifted so as to cause operation of an air motor 74 to effect the movement of the cover to the position of FIGURE 4

What is claimed is:

1. In combination with a trailer body having spaced side walls and a front wall, elevating and lowering means supported on said walls, frame means overlying upper edges on said walls and secured to said elevating and lowering means for vertical movement relative to said upper edges, longitudinally disposed track means on each side of said frame means over said side walls, track extension means slidable in each of said track means adjacent said front wall from a first position generally inwardly of said front wall to a second position cantilevered generally outwardly of said front wall, a plurality of bows extending transversely of said body between said track means and supported thereon for movement longitudinally of said side walls, collapsable cover means supported by said bows and forming a top over said body when said bows are in predetermined longitudinally spaced relationship, and means for moving said bows from said spaced relationship to a lesser spaced relationship wherein said cover is supported partially outwardly of said front wall with said track extension means in said second position and the top of said body is substantially uncovered.

2. The combination of claim 1 further characterized by and including skirt means secured to and depending from said frame means whereby said skirt means closes the space between said frame means and said upper edges when said frame means and cover are raised by said elevating and lowering means.

References Cited by the Examiner
UNITED STATES PATENTS

| | | | |
|---|---|---|---|
| 2,757,042 | 7/56 | Schultz | 296—100 |
| 2,797,124 | 6/57 | Hauptli | 296—23 |
| 2,963,313 | 12/60 | Bennett | 296—23 |
| 3,041,104 | 6/62 | Richard | 296—100 |

A. HARRY LEVY, *Primary Examiner.*

PHILIP ARNOLD, *Examiner.*